United States Patent
Ye et al.

(10) Patent No.: US 7,679,938 B2
(45) Date of Patent: Mar. 16, 2010

(54) SYSTEM AND METHOD FOR PROVIDING CONTROL FOR SWITCH-MODE POWER SUPPLY

(75) Inventors: Jun Ye, Shanghai (CN); Zhen Zhu, Shanghai (CN); Shifeng Zhao, Shanghai (CN); Zhiliang Chen, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 12/273,362

(22) Filed: Nov. 18, 2008

(65) Prior Publication Data
US 2009/0067204 A1    Mar. 12, 2009

Related U.S. Application Data

(62) Division of application No. 11/514,771, filed on Aug. 31, 2006, now Pat. No. 7,492,619.

(30) Foreign Application Priority Data
Aug. 16, 2006    (CN) .................. 2006 1 0030188

(51) Int. Cl.
H02M 3/335    (2006.01)
(52) U.S. Cl. .................. 363/21.12; 363/21.15
(58) Field of Classification Search ............. 363/97, 363/21.08, 21.01, 21.4, 21.12, 21.15, 21.16, 363/21.17, 21.18, 41; 323/225, 315
See application file for complete search history.

(56) References Cited

U.S. PATENT DOCUMENTS

| | | | | |
|---|---|---|---|---|
| 5,771,565 A | * | 6/1998 | Walters | 29/596 |
| 5,812,383 A | * | 9/1998 | Majid et al. | 363/21.08 |
| 6,768,655 B1 | * | 7/2004 | Yang et al. | 363/21.01 |
| 6,980,442 B2 | * | 12/2005 | Lv et al. | 363/21.1 |
| 7,019,995 B2 | * | 3/2006 | Niemand et al. | 363/97 |
| 7,034,513 B2 | * | 4/2006 | Gan et al. | 323/285 |
| 7,099,164 B2 | * | 8/2006 | Zhu et al. | 363/21.12 |
| 2005/0281062 A1 | * | 12/2005 | Choi et al. | 363/21.08 |
| 2006/0171175 A1 | * | 8/2006 | Zhu et al. | 363/21.12 |
| 2006/0291258 A1 | * | 12/2006 | Zhu et al. | 363/21.12 |

* cited by examiner

Primary Examiner—Bao Q Vu
Assistant Examiner—Jue Zhang
(74) Attorney, Agent, or Firm—Jones Day

(57) ABSTRACT

System and method for providing control for switch-mode power supply. According to an embodiment, the present invention provides a system for regulating a power converter. The system comprises a signal processing component that is configured to receive a first voltage and a second voltage, to process information associated with the first voltage and the second voltage, to determine a signal based on at least information associated with the first voltage and the second voltage, and to send the signal to a switch for a power converter. The switch is regulated based on at least information associated with the signal. The signal processing component is further configured to determine the signal to be associated a first mode, if the first voltage is higher than a first threshold.

14 Claims, 10 Drawing Sheets

US 7,679,938 B2

SYSTEM AND METHOD FOR PROVIDING CONTROL FOR SWITCH-MODE POWER SUPPLY

CROSS-REFERENCES TO RELATED APPLICATIONS

This application is a division of U.S. application Ser. No. 11/514,771, filed Aug. 31, 2006, which claims priority to Chinese Patent Application No. 200610030188.X, filed Aug. 16, 2006, entitled "System and method for providing control for switch-mode power supply", by inventors Jun Ye, Zhen Zhu, Shifeng Zhao, Zhiliang Chen, and Lieyi Fang, commonly assigned, both applications being incorporated by reference herein for all purposes.

BACKGROUND OF THE INVENTION

The present invention is related to integrated circuits. More specifically, the present invention can be applied to controllers used for switch mode power supply. According to various embodiments, the present invention provides various power control schemes to reduce standby power consumption and improves system efficiency. Merely by way of example, the present invention can be used in switch mode power conversion system including, among, other things, offline fly-back converters and forward converters. It is to be appreciated that the present invention has a broad range of applications.

Power converters are widely used in various applications, such as providing power to portable consumer electronics. The power converters can convert electric power from one form to another form. As an example, the electric power is transformed from alternate current (AC) to direct current (DC), from DC to AC, from AC to AC, or from DC to DC. Additionally, the power converters can convert electric power from one voltage level to another voltage level.

In the past various types of power converters have been developed. For example, linear regulators have traditionally been used for power converters. A linear regulator is a voltage regulator based on an active device (such as a bipolar junction transistor, field effect transistor or vacuum tube) operating in its "linear region" or passive devices like zener diodes operated in their breakdown region. The regulating device is made to act like a variable resistor. While linear regulators have been used for many years, their power efficiency is often inadequate for portable electronics. For example, due to low power efficiency, linear regulators often waste large amount of energy and generate excessive heat for portable devices.

With the advent of integrated circuits, switched-mode power supply has been invented and utilized for various applications. Switch mode power supplies are typically implemented with a switching regulator, which is an internal control circuit that switches the load current rapidly on and off in order to stabilize the output voltage. For certain applications, switch-mode power supply uses pulse-width-modulated (PWM) or pulse-frequency-modulated (PFM) mechanism. These mechanisms are usually implemented with a switch-mode-controller including various protection components.

In recent years, power systems are often required to comply with standards for energy consumption. For example, various international organizations have imposed energy saving standards such as "Energy Star", "Blue Angel", etc. For example, such standards impose requirements that, among other things, power supplies have low standby power consumption (i.e., high power efficiency under very light or zero load condition).

In the past various techniques have been developed to lower various forms of power consumption. For example, different types of standby power consumption schemes have been developed. Unfortunately, conventional techniques are often inadequate.

Therefore, it is desirable to have improved systems and methods for power systems.

BRIEF SUMMARY OF THE INVENTION

The present invention is related to integrated circuits. More specifically, the present invention can be applied to controllers used for switch mode power supply. According to various embodiments, the present invention provides various power control schemes to reduce standby power consumption and improves system efficiency. Merely by way of example, the present invention can be used in switch mode power conversion system including, among, other things, offline fly-back converters and forward converters. It is to be appreciated that the present invention has a broad range of applications.

According to an embodiment, the present invention provides a system for regulating a power converter. The system comprises a signal processing component that is configured to receive a first voltage and a second voltage, to process information associated with the first voltage and the second voltage, to determine a signal based on at least information associated with the first voltage and the second voltage, and to send the signal to a switch for a power converter. The switch is regulated based on at least information associated with the signal. The signal processing component is further configured to determine the signal to be associated a first mode, if the first voltage is higher than a first threshold. If the first voltage is lower than a second threshold and the second voltage is higher than a third threshold, the signal processing component determines the signal to be associated with a second mode. If the first voltage is lower than the second threshold and the second voltage is lower than the third threshold, the signal processing component determines the signal to be associated with a third mode. If the signal is associated with the first mode, the signal processing component causes the switch to be modulated at a first frequency. If the signal is associated with the second mode, the signal processing component causes the switch not to be modulated. If the signal is associated with the third mode, the signal processing component causes the switch to be closed for a period of time.

According to another embodiment, the present invention provides a method for regulating a power converter. The method includes a step for receiving a first voltage. The method also includes a step for receiving a second voltage. The method additionally includes a step for processing information associated with the first voltage and the second voltage. Additionally, the method includes a step for determining a signal based on at least information associated with the first voltage and the second voltage. Further, the method includes a step for regulating a switch for a power converter based on at least information associated with the signal. The determining a signal is based on at least information associated with the first voltage and the second voltage. If the first voltage is higher than a first threshold, the signal is associated a first mode. If the first voltage is lower than a second threshold and the second voltage is higher than a third threshold, the signal is associated with a second mode. If the first voltage is lower than the second threshold and the second voltage is lower than the third threshold, the signal to is associated with a third mode. The step of regulating a switch for a power converter includes causing the switch to be modulated at a first frequency if the signal is associated with the first mode. If the signal is associated with the second mode, the switch is not modulated. If the signal is associated with the third mode, causing the switch is closed for a period of time.

According to yet another embodiment, the present invention provides a system for regulating a power converter. The system includes a signal processing component that is configured to receive a first voltage and a second voltage, to process information associated with the first voltage and the second voltage, to determine a signal based on at least information associated with the first voltage and the second voltage, and to send the signal to a switch for a power converter. The switch is regulated based on at least information associated with the signal. The signal processing component is configured to determine the signal to be associated with a first mode, if the first voltage is higher than a first threshold. If the first voltage is lower than a second threshold and the second voltage is higher than a third threshold, the signal is associated with a second mode. If the first voltage is lower than the second threshold and the second voltage is lower than the third threshold, the signal is associated with a third mode. If the signal is associated with the first mode, the signal processing component causes the switch to be modulated at a first frequency. If the signal is associated with the second mode, the signal processing component causes the switch not to be modulated. If the signal is associated with the third mode, the signal processing component causes the switch to be modulated at a second frequency.

According to yet another embodiment, the present invention provides a method for regulating a power converter. The method includes a step for receiving a first voltage. The method also includes a step for receiving a second voltage. The method additionally includes a step for processing information associated with the first voltage and the second voltage. Also, the method includes a step for determining a signal based on at least information associated with the first voltage and the second voltage. The method further includes a step for regulating a switch for a power converter based on at least information associated with the signal. The step of determining a signal based on at least information associated with the first voltage and the second voltage includes determining various voltages. If the first voltage is higher than a first threshold, the signal is associated a first mode. If the first voltage is lower than a second threshold and the second voltage is higher than a third threshold, the signal is associated with a second mode. If the first voltage is lower than the second threshold and the second voltage is lower than the third threshold, the signal is associated with a third mode. If the signal is associated with the first mode, the switch is modulated at a first frequency. If the signal is associated with the second mode, the switch is not modulated. If the signal is associated with the third mode, the switch is modulated at a second frequency.

According to yet another embodiment, the present invention provides a system for regulating a power converter. The system includes a signal processing component configured to receive a voltage, to process information associated with the voltage, and to determine a signal based on at least information associated with the voltage, and to send the signal to a switch for a power converter. The switch is regulated based on at least information associated with the signal. If the voltage is higher than a first threshold, the signal is associated with a first mode. If the voltage is lower than a second threshold, the signal is associated with a second mode. The signal processing component is configured to process information associated with the voltage, a third threshold, and a fourth threshold, the third threshold and the fourth threshold being different. The signal processing component is further configured to determine a modulation frequency based on at least information associated with the first voltage, the third threshold, and the fourth threshold. If the signal is associated with the first mode, the signal processing component causes the switch to be modulated at the modulation frequency. If the signal is associated with the second mode, the signal processing component causes the switch not to be modulated.

According to yet another embodiment, the present invention provides a method for regulating a power converter. The method includes a step for receiving a voltage. The method also includes step for processing information associated with the voltage. The method additionally includes a step for determining a signal based on at least information associated with the voltage. The method further includes a step for regulating a switch for a power converter based on at least information associated with the signal. If the voltage is higher than a first threshold, the signal is associated a first mode. If the voltage is lower than a second threshold, the signal is associated with a second mode. The signal is determined based on at least information associated with the voltage further. The process of determining the signal includes processing information associated with the voltage, a third threshold, and a fourth threshold, the third threshold and the fourth threshold being different. The process of determining the signal further includes a step for determining a modulation frequency based on at least information associated with the first voltage, the third threshold, and the fourth threshold. If the signal is associated with the first mode, the switch is modulated at the modulation frequency. If the signal is associated with the second mode, the switch is not modulated.

It is to be appreciated that the present invention provides various advantages over conventional techniques. According to an embodiment, the present invention provides a more energy efficient solution as compared to conventional techniques. For example, the present invention reduces the numbers of transitions between on and off states of a power supply. According to another embodiment, the present invention offers a large window for power control and great flexibility. For example, more than one threshold voltage threshold values are used in determining various states of the power supply. There are other benefits as well.

Various additional objects, features and advantages of the present invention can be more fully appreciated with reference to the detailed description and the accompanying drawings that follow.

DETAILED DESCRIPTION OF THE INVENTION

The present invention is related to integrated circuits. More specifically, the present invention can be applied to controllers used for switch mode power supply. According to various embodiments, the present invention provides various power control schemes to reduce standby power consumption and improves system efficiency. Merely by way of example, the present invention can be used in switch mode power conversion system including, among, other things, offline fly-back converters and forward converters. It is to be appreciated that the present invention has a broad range of applications.

As mentioned above, various techniques have been developed for efficient power systems. For example, conventional systems attempted to reduce switching power due to core loss of transformers and inductors in a power system and power loss due to the snubber. Typically, power losses are related with switching events. For example, high frequency switching usually results in high switching power loss. Conventional techniques typically attempt to reduce power loss by reducing switching frequency (e.g., use lower switching frequencies).

Unfortunately, low switching frequency can cause various design challenges and problems. For example, low frequency switching design often renders transform design difficult. According to a conventional technique, to solve low frequency design problem, the switching frequency is adjusted according to the load. For example, high frequency is used at heavy load, and low frequency used at light or no load. As a result, the power loss that relates to frequency is reduced at light or no load condition maintaining. At the same time, a high frequencies at heavy load can be used if needed.

The frequency reduction usually improves power efficiency at light or zero load conditions, but often leads to other types of problems. For example, low frequencies can sometimes cause audio noise. When the switching frequency is reduced to audio frequency range, the system often causes unavoidable and undesirable audible noise.

To improve power efficiency and reduce audio noise, various conventional power system utilizes burst mode techniques. Depending upon load conditions, some PWM cycles are skipped and the operation of the power system becomes asynchronous.

Figure 1:
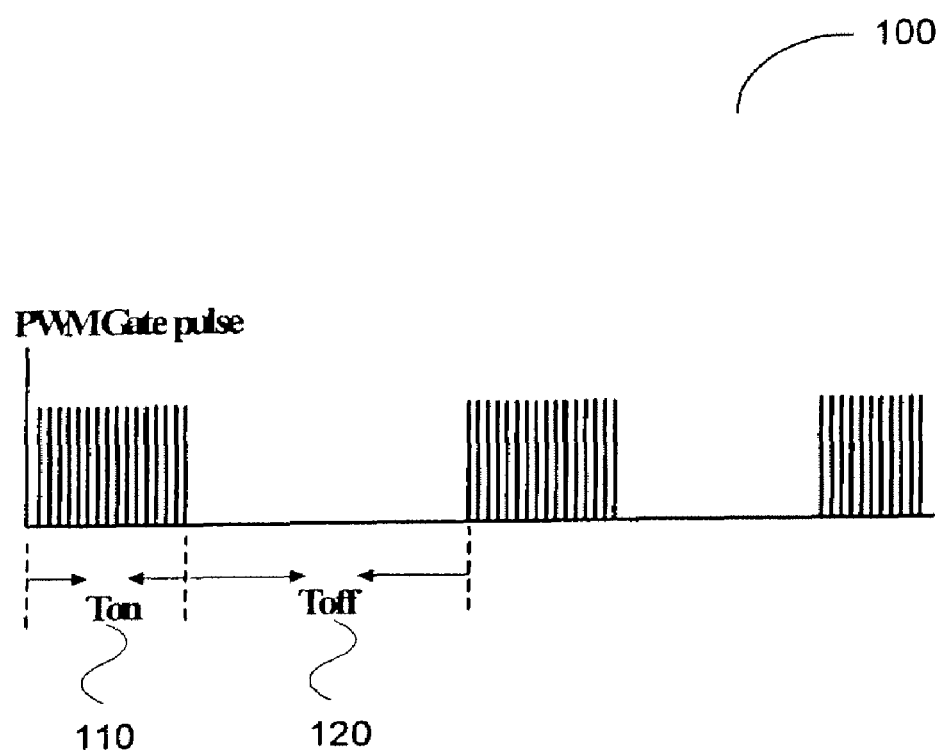
FIG. 1 is a simplified diagram illustrating a burst mode operation of a conventional power system.

FIG. 1 is a simplified diagram illustrating a burst mode operation of a conventional power system. This diagram is merely an example, which should not unduly limit the scope of the claims. One of ordinary skill in the art would recognize many variations, alternatives, and modifications.

During a power on time (Ton) 110, a PWM signal turns on a power switch and forces the energy delivered to the load. During a power off time (Toff), a PWM signal turns off a power switch and stops energy from being delivered to the load. The switching frequency is above the audible frequency range (i.e., greater than 22K Hz). Consequently, no audible noise is generated. At the same time, standby power consumption is reduced.

Figure 2:
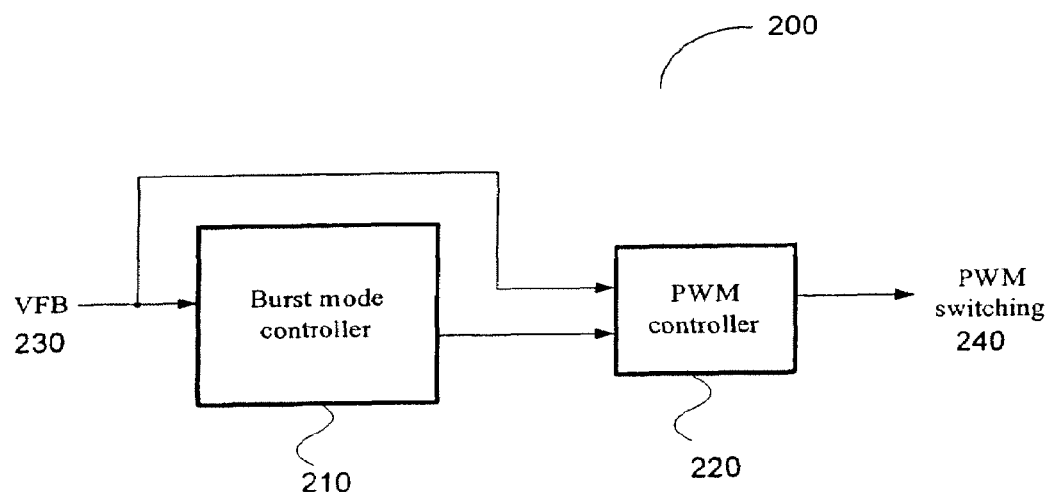
FIG. 2 is a simplified diagram illustrating a conventional burst mode controller.

FIG. 2 is a simplified diagram illustrating a conventional burst mode controller. This diagram is merely an example, which should not unduly limit the scope of the claims. One of ordinary skill in the art would recognize many variations, alternatives, and modifications. For example, a burst control system 200 includes a burst mode controller 210 and a PWM controller 220. Both Ton and Toff signals from FIG. 1 are associated with the an error amplifier output (VFB) 230. When the load in a power system has small power demand, the VFB is at low voltage level. When the VFB voltage is less than a predetermined voltage level, the PWM controller 220 stops the switching operation. As a result, no energy is delivered to the load, and the output voltage decreases. Typically, the decreased output voltage level causes (i.e., by negative feedback) an increase of the VFB voltage level. When VFB is greater than a second predetermined level, PWM controller 220 resumes the switching operation. By turning on and off the switching by the PWM controller, system power consumption is reduced.

Unfortunately, a conventional system as the burst control system 200 often has various drawbacks. For example, temporary stop of switching can lead to slow response time. The stop of switching typically leads to drops for both output voltage and the power supply, and ultimately causes slow response time. For example, when the power supply drops below an under-voltage lockout (UVLO) threshold, the PWM controller is turned off and a new startup cycle is initiated. A startup cycle typically takes up to seconds. During the startup cycle, the output voltage can be unregulated and fall off. To ensure that the output voltage remains regulated, it is often necessary to maintain the voltage supply above the UVLO threshold voltage. Usually, a minimum duty cycle (i.e., a duty cycle of a predetermined period of time) of the PWM burst is required to maintain stability and energy balance of the power supply. For example, the minimum duty cycle of the PWM is used to deliver a sufficient amount of energy to the power system and to keep the voltage supply above the UVLO threshold voltage.

Therefore, it is to be appreciated that various embodiments of the present invention provide burst mode control schemes with extended range and higher efficiency. For example, during operation the burst mode control monitor monitors both the supply voltage VDD and the VFB voltage. Among other things, a power system according to the present invention prevents the supply voltage from dropping below the UVLO threshold voltage. At the same time, the power system maintains the advantages (e.g., power efficiency, etc.) of the burst mode operation.

Figure 3:
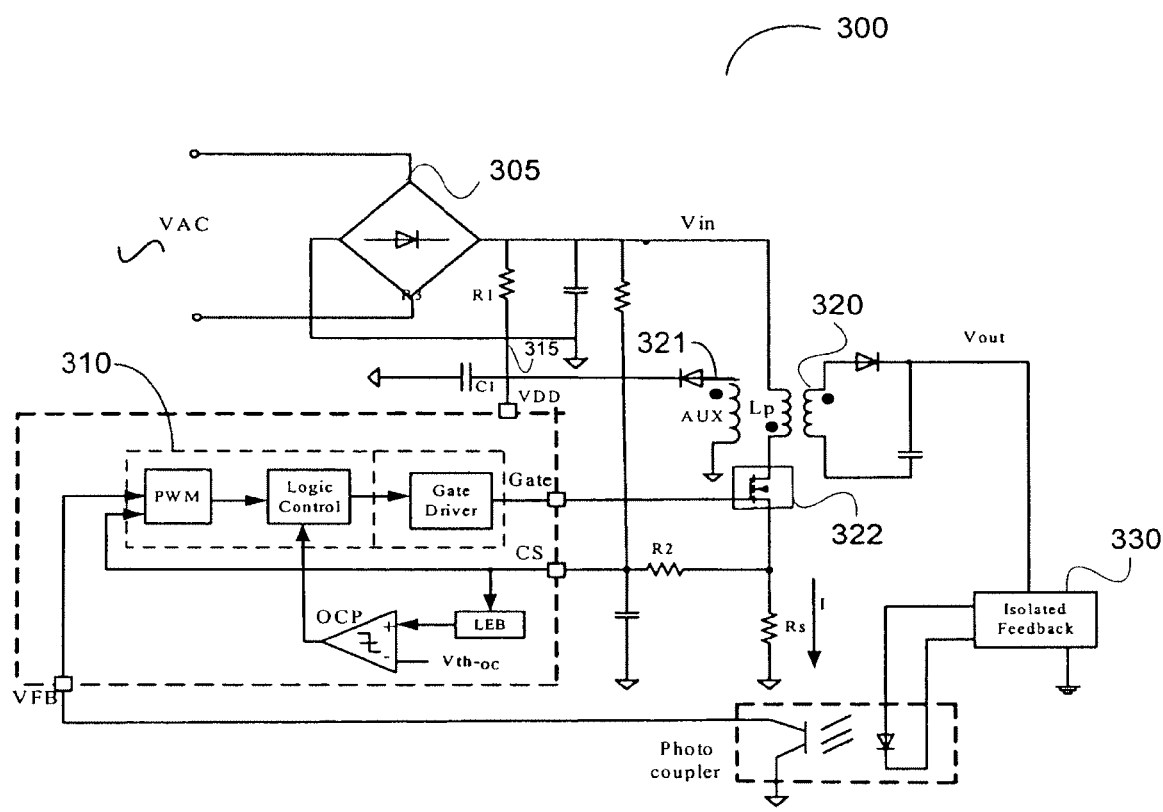
FIG. 3 is a simplified diagram illustrating a power system according to an embodiment of the present invention.

FIG. 3 is a simplified diagram illustrating a power system according to an embodiment of the present invention. This diagram is merely an example, which should not unduly limit the scope of the claims. One of ordinary skill in the art would recognize many variations, alternatives, and modifications. A power system 300 includes, among other things, a controller module 310, a power supply 305, a primary winding 320, a switch 322, an auxiliary winding 321, and an isolated feedback 330. The controller module 310 is configured to control the output of the power system 300 based on, among other things, a current sensing (CS) signal and a VFB voltage.

Figure 4:
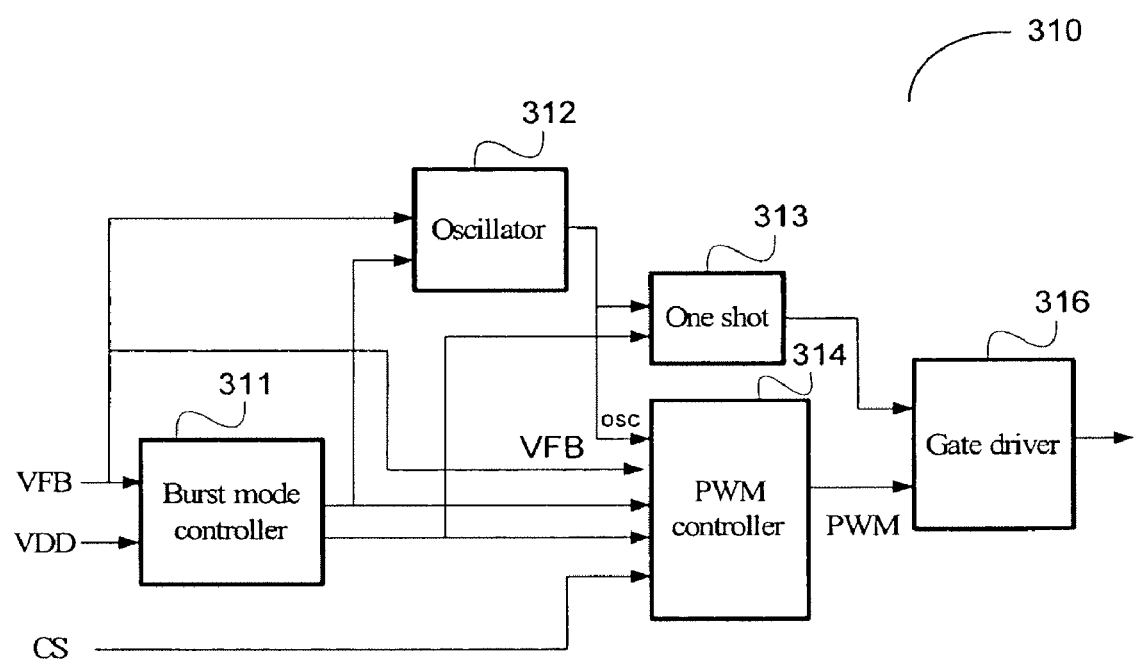
FIG. 4 is a simplified diagram illustrating a controller module for a power system according to an embodiment of the present invention.

FIG. 4 is a simplified diagram illustrating a controller module for a power system according to an embodiment of the present invention. This diagram is merely an example, which should not unduly limit the scope of the claims. One of ordinary skill in the art would recognize many variations, alternatives, and modifications. The controller module 310 includes a burst mode controller module 311, a PWM controller module 314, a clock 312, an one-shot module 313, and a gate driver 316. The burst mode controller module 311 receives inputs from both the output (i.e., the VFB signal) and the power supply (VDD). The PWM controller module 313 receives an input from the clock 312 (e.g., implemented by an oscillator), an input from the VFB signal, an input from the CS signal, and two inputs from the burst mode controller module 311.

Both the burst mode controller module 311 and the PWM controller module 314 utilizes the VFB signal to monitor output of the power system. The VFB signal is a feedback voltage that is related to the load of the system. For example, the VFB signal is a negative feedback voltage from the load. As another example, the VFB signal is a positive feedback voltage from the load. The PWM controller module 314 controls pulse width, which determines the amount of power to be transferred to the output, by comparing the VFB signal with the CS signal. According to a specific embodiment, the burst mode controller module 311 is configured to provide control signals to turn the PWM controller module 314 on or off. For example, the VFB signal decreases in its amplitude under light (or zero) load condition, and the VFB signal increases in its amplitude as load increases.

While in operation, the burst mode controller module 311 monitors both the VFB and the VDD voltage level. For example, when the VFB signal is lower than a threshold level, the burst mode controller module 311 enters a burst mode. At the burst mode, the output of the PWM controller module 314 is disabled and the output from the gate driver 316 is also disabled. The switch 322 stays at an "off" state until the voltage of VFB signal rises above a threshold voltages. For example, the voltage of the VFB signal rises due to an decrease in output voltage.

When the power has light or zero load, the VDD voltage is typically low. This is because the VDD voltage (as illustrated in FIG. 3) is supplied by the auxiliary winding 312, which is electrically coupled to the output (i.e., the primary and secondary winding). According to a specific embodiment, when the VDD voltage drops below a threshold level, the burst mode controller module 311 enables an one-shot signal. For example, the burst mode controller module 311 causes the one shot module 313 to output a one-shot signal to the gate driver 316. As merely an example, a one-shot signal enables a pulse with a predetermined duration so that the pulse provides enough energy for the VDD voltage level to remain above the threshold level. The one shot signal causes the power switch 322 to be at an "on" state, which allows the VDD voltage level to be maintained. According to another specific embodiment, the burst monde controller module 311 turns PWM switching on until the VDD voltage level rises above the threshold level.

Switching events of the power system are triggered by clock signals generated by the clock 312. As shown in FIG. 4, the clock 312 is configured to receive the VFB signal and an output from the burst mode controller module 311. For example, clock signals are characterized by a clock frequency. The clock frequency can be set to either high or low frequency. When the voltage of the VFB signal is lower (e.g., under light or zero load condition) than a threshold voltage level, the power system operates in a burst mode and at a low switching frequency (i.e., clock frequency is set to low). When the voltage of the VFB signal is higher (e.g., under heavy load condition and/or when load increases) than the threshold level, the power system operates in the burst mode and at a high or normal frequency (i.e., clock frequency is high).

Figure 5:
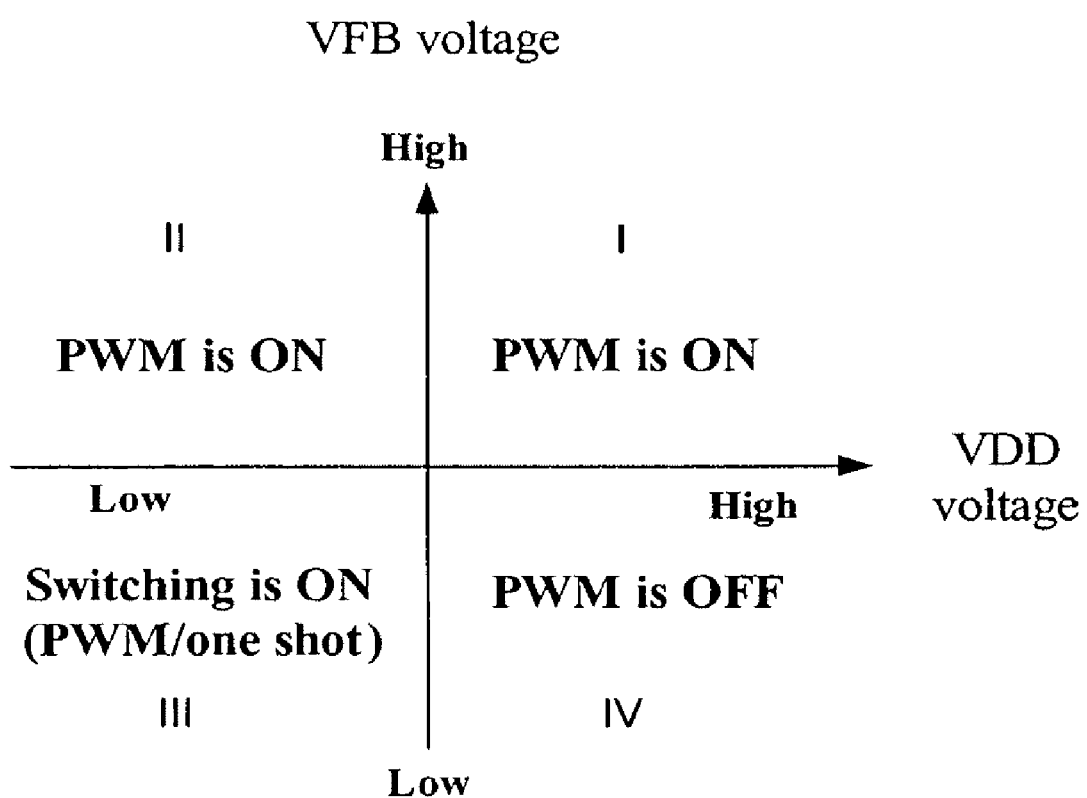
FIG. 5 is a simplified diagram illustrating the operation of a power system according to an embodiment of the present invention.

FIG. 5 is a simplified diagram illustrating the operation of a power system according to an embodiment of the present invention. This diagram is merely an example, which should not unduly limit the scope of the claims. One of ordinary skill in the art would recognize many variations, alternatives, and modifications. Merely by way of an example, FIG. 5 illustrates the operation of the power system 300 in FIG. 3. As shown in FIG. 5, the embodiment of the present invention is implemented with a two-dimensional control scheme. It is to be noted the two-dimension control scheme according to the embodiment is superior to the conventional one-dimension control schemes.

A power system according to a specific embodiments operates in four quadrants. The four quadrants are determined based on the VFB voltage and the VDD voltage. For example, the VFB voltage is the feedback voltage signal and the VDD voltage is the power supply voltage. It is to be understood that the axes represent threshold voltages. For example, at the intersection of the two axes, both the VFB voltage and the VDD voltage are non-zero and positive. According to a specific embodiment, the horizontal axis represents a threshold voltage for the VFB voltage. According to another embodiment, there could be more than one horizontal axis if there are more than one threshold voltages for the VFB voltage. Similarly, the vertical access represents a threshold voltage for the VDD voltage.

In Quadrant I, the power system operates in normal operation mode. For example, both the VDD and VFB voltages are high, and the PWM switching is turned on.

In Quadrant II, the VFB voltage is high while the VDD voltage is low. For example, PWM switching is turned on, even when the VDD voltage is very low.

In Quadrant III, both the VFB voltage and the VDD voltages are low. For example, then a pulse is provided by the one-shot controller module (e.g., the one-shot controller module 313 in FIG. 4). As another example, the switching of the power system is temporarily turned on by the PWM controller module.

In Quadrant IV, the VFB voltage is low and the VDD voltage is high, which usually means that the load is very light or zero. For example, in response to light or zero load, the PWM switching is turned off to maintain balance of the power system. As another example, the PWM switching is operating at a much lower above-audible frequency when the VFB voltage is very low.

Figure 6:
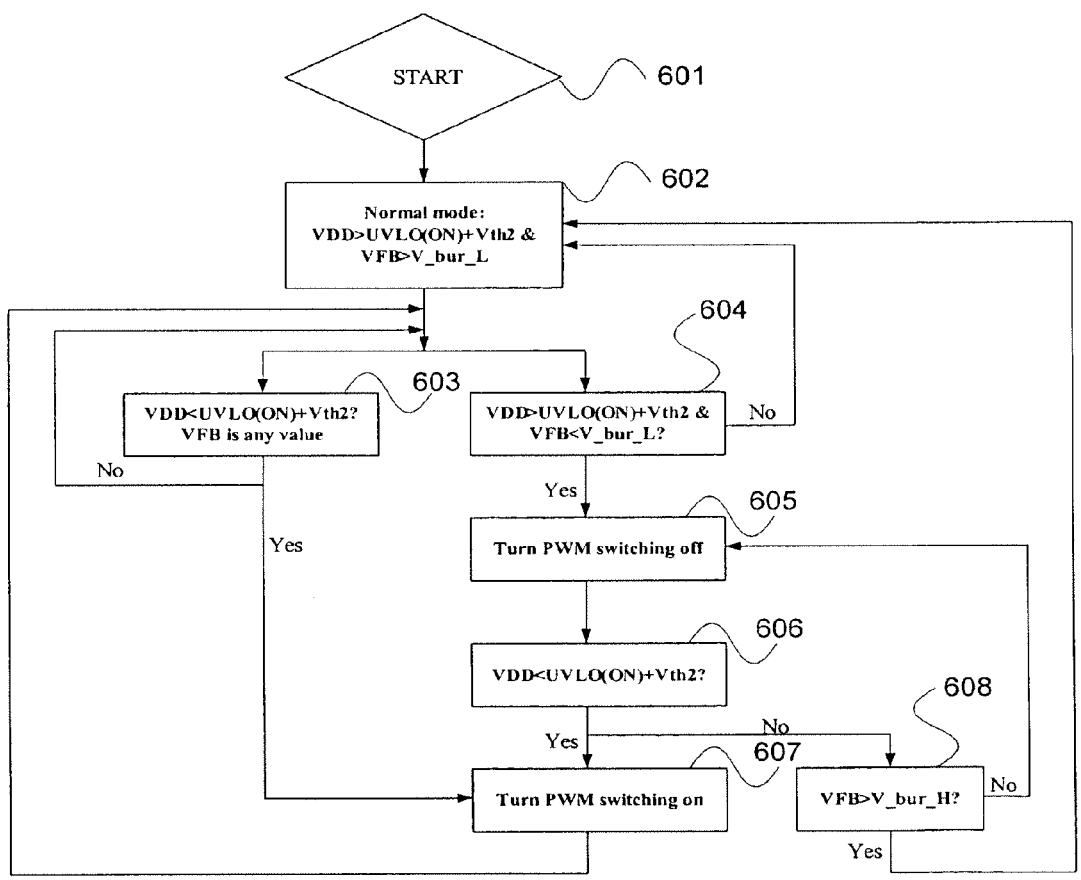
FIG. 6 is a simplified flow diagram illustrating the operation of a power system according to an embodiment of the present invention.

FIG. 6 is a simplified flow diagram illustrating operation of a power system according to an embodiment of the present invention. This diagram is merely an example, which should not unduly limit the scope of the claims. One of ordinary skill in the art would recognize many variations, alternatives, and modifications. For example, various steps in the flow diagram can be added, removed, replace, repeated, overlapped, and partially overlapped.

At step 601, the system starts. For example, various components as illustrated in FIG. 3 are powered on and started. According to a specific embodiment, logic and algorithms of various control components are properly initialized. According to another example, various electrical components are properly charged to desirable states.

At step 602, the system operates in normal operation mode. According to a specific embodiment, to operate in the normal operation mode, two conditions are required. First, the supply voltage VDD must be greater than the sum of a UVLO(ON) voltage (e.g., under-voltage lockout voltage) and a Vth2 (i.e., a predetermined threshold voltage). Second, the VFB voltage is greater than a threshold voltage V_bur_L (i.e., a predetermined threshold voltage for burst mode control). For example, when the system operates in normal operation mode, the power regulation is controlled by the PWM controller module 314 in FIG. 4. It is to be understood that required threshold voltages can be set according to specific applications.

During operation, voltages levels of various components of the system may change. For example, the VFB voltages may move up or down. As another example, the supply voltage VDD may change.

At step 604, the system determines whether the supply voltage VDD is greater than the sum of the UVLO(ON) voltage and a threshold voltage Vth2 and whether the VFB voltage is less than the threshold voltage V_bur_L. Typically, when VFB voltage is less than the threshold voltage V_bur_L, the system is operating with light load and it is often desirable for the system to enter burst mode. For example, the system typically consumes less power during burst mode operation. If the supply voltage VDD is greater than the sum of the UVLO(ON) voltage and the threshold voltage Vth2 and the VFB voltage is less than the threshold voltage V_bur_L, the system operates in burst mode, at step 605. According to a specific embodiment, the burst mode controller module 311 in FIG. 4 provides a burst mode signal that causes the system to enter burst mode.

According to a specific embodiment, at step 605, the PWM switching is turned off and the system operates in burst mode. According to another embodiment, at step 605 the PWM switching is operated at a much lower frequency compared to the normal operation mode. Depending upon application, the system consumes less energy in burst mode when PWM switching is turned off or operating at a lower frequency. During the burst mode operation, little or no energy is provided for the supply voltage VDD. As a result, the supply voltage VDD drops during the burst mode operation. For example, the burst mode controller module 311 controls the burst mode operation of the system. According to a specific embodiment, the burst mode controller module 311 is configured to turn PWM switching on or off.

At step 606, the system determines whether the VDD voltage drops below the sum of the UVLO(ON) voltage and the threshold voltage Vth2. For example, the system cannot properly operate when the VDD is too low. If the VDD voltage is below the sum of the UVLO(ON) voltage and the threshold voltage Vth2, the system enters step 607. If the VDD voltage is above the sum of the UVLO(ON) voltage and the threshold voltage Vth2, the system enters step 608.

At step 607, energy is supplied cause the VDD voltage rise above the sum of the UVLO(ON) voltage and the threshold voltage Vth2. It is to be appreciated, by ensuring that VDD voltage is above the sum of the UVLO(ON) voltage and the threshold voltage Vth2, VDD would not drop below the UVLO(ON) voltage, which determines whether the power system would be restarted. According to a specific embodiment, the PWM switching is enabled by either the PWM controller module 314 in FIG. 4, For example, PWM switching can also enabled by the burst mode controller module 311 that sends a signal that enables PWM switching. After the PWM switching is enabled, the VDD voltage increases. The PWM switching stays on until in step 603 that the VDD voltage is greater than the sum of the UVLO(ON) voltage and the threshold voltage Vth2. As an example, as both the load and the VDD voltage increases, the VFB voltage increases as well. When the VFB voltage is larger than a V_bur_H voltage (i.e., a predetermined threshold voltage for burst mode control), the system stops operating in burst mode and operates normal mode.

According to another embodiment, the one-shot controller module provides a pulse to the switch of the power system that causes the VDD voltage to increase above the sum of the UVLO(ON) voltage and the threshold voltage Vth2.

At step 608 (i.e., after it is determined that the VDD voltage is above the sum of the UVLO(ON) voltage and the threshold voltage Vth2), the VFB voltage is compared with the V_bur_H voltage. If the VFB voltage is higher than the threshold voltage V_bur_H (e.g., the load on the system is heavy), the system stops operating in burst mode and operates in normal mode. On the other hand, if the VFB voltage is lower than the V_bur_H voltage, the system stays in the burst mode.

Figure 7:
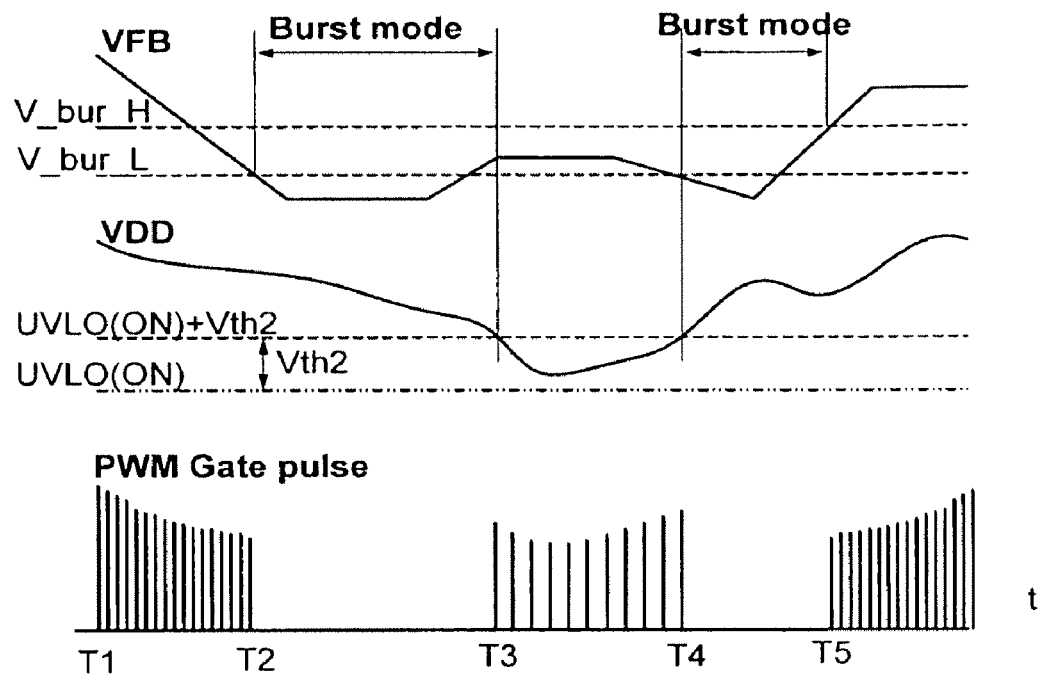
FIG. 7 is a simplified timing diagram illustrating the operation of the power control system according to an embodiment of the present invention.

It is to be understood that FIG. 6 merely provides a specific example. There can be many variation, alternations, and modifications. For example, various threshold voltages To further illustrate the operation of the power control system, FIG. 7 is presented. FIG. 7 is a simplified timing diagram illustrating the operation of the power control system. This diagram is merely an example, which should not unduly limit the scope of the claims. One of ordinary skill in the art would recognize many variations, alternatives, and modifications. For example, FIG. 7 illustrates the operation of the system 300 as shown in FIG. 3.

At T1, the system operates in normal mode (i.e., PWM switching is used). The VFB voltage is above the V_bur_H voltage, the supply voltage VDD is greater than the sum of the UVLO(ON) voltage and the threshold voltage Vth2, and the system operates in a normal mode (e.g., regular PWM switching mode). For example, the system operates in the normal mode as described in step 602 in FIG. 6. Depending upon applications, the PWM controller module 314 controls the PWM switching operation during the normal operation mode.

Between T1 and T2, the system continues operating in the normal mode. At T2, the system stops operating in the normal mode when the VFB voltage drops below the V_bur_H voltage, which means that the load on the system is light or small. For example, the system operates in burst mode to conserve energy. Depending upon applications, the system burst mode controller module 311 in FIG. 4 controls the burst mode operation.

Between T2 and T3, the system continues operating in burst mode. For example, during the time between T2 and T3, the VDD voltage drops due to the burst mode operation. At a certain time between T2 and T3, the VFB increases. For example, additional loads are connected to the system.

At T3, VDD voltage drops below the sum of the UVLO (ON) voltage and the threshold voltage Vth2. In response, the system turns on PWM switching. Depending upon application, the PWM operation is controlled by either the PWM controller module 314 and/or the one-shot controller module 313 as shown in FIG. 4.

Between T3 and T4, the PWM switching is on. For example, the PWM switching stays on until the VDD voltage rises above the sum of the UVLO(ON) voltage and the threshold voltage Vth2, at T4. For example, the operation of the system between T3 and T4 are illustrated in steps 607 and 603 in FIG. 6. At T4, the system once again turns off PWM switching and operates in burst mode to conserve energy. For example, burst mode operation is controlled by the burst mode controller module 311 in FIG. 4.

Between T4 and T5, the system operates in burst mode. At T5, the VFB voltage rises above the threshold voltage V_bur_H. For example, the VFB voltage increases due to an increase on the load that is connected to the system. As an example, to be able to provide a sufficient amount of energy to the load, the system turns on PWM switching and resumes in the normal operation mode.

It is to be appreciated that FIG. 7 merely provides an example, which should not unduly limit the scope of the claims. For example, the VDD and VFB voltages as shown in FIG. 7 merely provide an example of the system operation.

Figure 8:
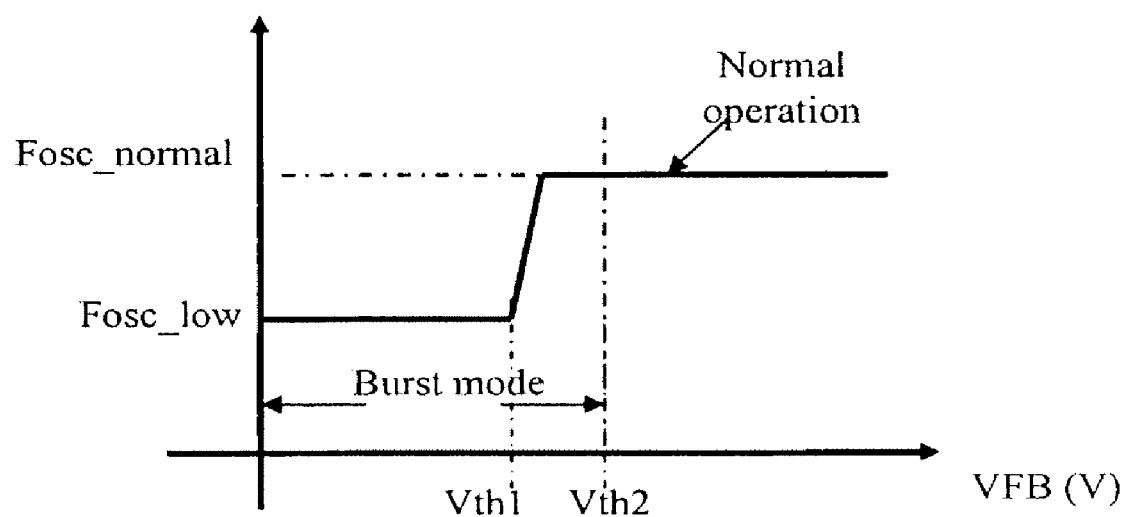
In FIG. 8, the horizontal axis is used to represent the VFB voltage level and the vertical axis is used to represent the frequency of PWM switching.

FIG. 8 is a simplified diagram illustrating a burst mode operation according to an embodiment of the present invention. This diagram is merely an example, which should not unduly limit the scope of the claims. One of ordinary skill in the art would recognize many variations, alternatives, and modifications.

In FIG. 8, the horizontal axis is used to represent the VFB voltage level and the vertical axis is used to represent the frequency of PWM switching. Depending upon application, the PWM switching may operate in two frequencies: normal frequency (i.e., Fosc_normal as shown in FIG. 8) and low frequency (i.e., Fosc_low as shown in FIG. 8). For example the low frequency is still above the audible frequency range of 22 kHz. According to a specific embodiment, the PWM switching operates in two modes: on and off.

The frequency and/or mode of PWM switching depends on the VFB voltage. As shown in FIG. 8, there are two threshold levels (i.e., Vth1 and Vth2 as shown in FIG. 8) for the VFB voltage. According to an embodiment, a drop of VFB voltage to below the threshold voltage Vth1 causes the PWM switching to stop operating in low frequency mode and to resume operating at the normal frequency.

There could be various way to implement the system described in FIGS. 3 through 8. For example, the PWM controller module, the one shot controller module, and the burst mode controller module are implemented with digital logical control devices. As another example, various components of the system are implemented with logical units. FIG. 8 is a simplified diagram illustrating a burst mode controller module according to an embodiment of the present invention. This diagram is merely an example, which should not unduly limit the scope of the claims. One of ordinary skill in the art would recognize many variations, alternatives, and modifications.

According to a specific embodiment, the burst mode controller module is configured to turn the PWM controller module and the one-shot controller module on or off. For example, the burst mode controller module is implemented with various logical components. According to a specific embodiment, a burst mode controller module 900 can be used as a component for the system 300 in FIG. 3. For example, the burst mode controller module 900 is the same the burst controller module 311 in FIG. 4. According to certain embodiments, the logic control of the burst mode controller module is configured to perform the operation illustrated by FIG. 6.

Figure 9:
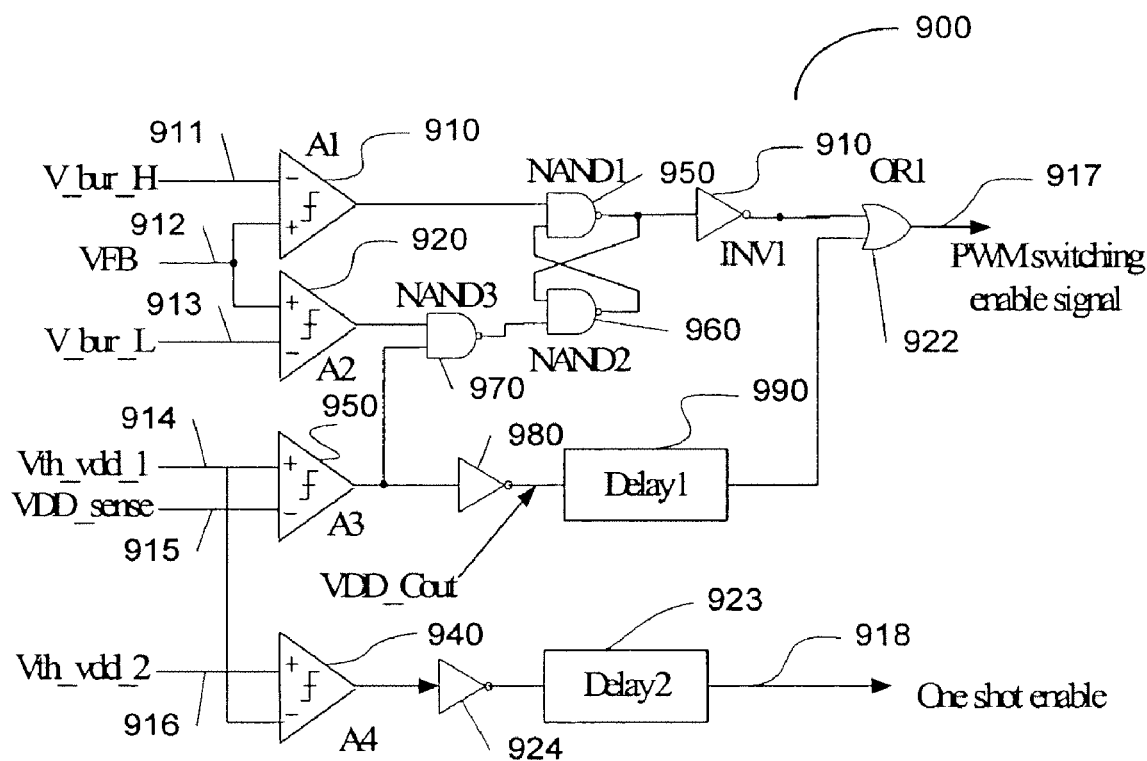
FIG. 9 is a simplified diagram illustrating logical components of a burst mode controller component according to an embodiment of the present invention.

FIG. 9 is a simplified diagram illustrating logical components of a burst mode controller component according to an embodiment of the present invention. As shown in FIG. 9, a burst mode controller module 900 includes the following components:

1. a comparator 910;
2. a comparator 920;
3. a comparator 930;
4. a comparator 940;
5. a NAND gate 950;
6. a NAND gate 960;
7. a NAND gate 970;
8. an inverter 980;
9. an inverter 924;
10. an inverter 921;
11. a delay 990;
12. a delay 923; and
13. an OR gate 922.

The comparators 910 and 920 compare the VFB voltage with threshold voltages V_bur_L and V_bur_H. According to the embodiment, the NAND gates 970, 960, and 950, the OR gate 922, and the inverter 921, as shown, are used to provided logic output based on the VFB voltage and VDD voltage inputs. It should be understood that other implementations are possible. For example, logic control function may be implemented with XOR gates in combination with AND gates.

Based on the voltage level of the VFB voltage and VDD voltage inputs, the burst mode controller module 900 is able to determine whether the PWM switching should be turned on or off. For example, the burst mode controller module determines the operation of PWM switching as shown in steps 604 and 608 as shown in FIG. 6.

The operation of the burst mode controller module can be demonstrated by the following example. When the VFB input 912 is less than the V_bur_H input 911 and the VDD_sense input 915 is larger than the Vth_vdd_1 input 914, then the output of the inverter 921 is zero and the output of the inverter 980 is also zero. Since both the output of the inverter 921 and the output of the inverter 980 are zero, the output of the OR gate 922 is also zero, which disables PWM switching. On the other hand, if the VFB input 912 is less than the V_bur_H input 911 and the VDD_sense input 915 is less than the Vth_vdd_1 input 914, then the output of the inverter 921 is zero and the output of the inverter 980 is "1". As a result, the output of the OR gate 922 is "1", which enables PWM switching. When the VDD_sense input 915 is less than the Vth_vdd_2, a one-shot controller module is enabled to generate a minimum pulse, which prevents the VDD voltage from dropping below the UVLO threshold voltage. For example, the burst mode controller module 900 is configured to provide necessary control signals to carry out the operation of the power system as illustrated according to FIG. 6.

Figure 10:
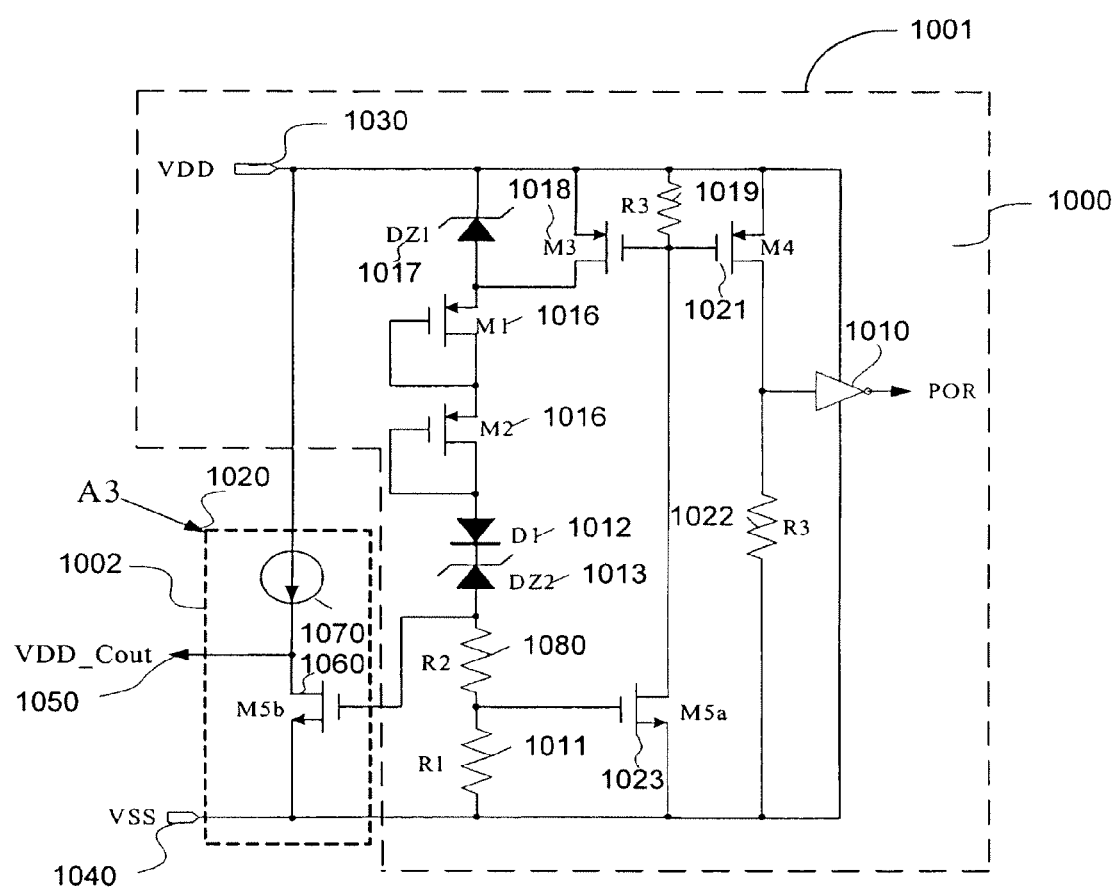
FIG. 10 is a simplified diagram illustrating a supply voltage monitor according to an embodiment of the present invention.

FIG. 10 is a simplified diagram illustrating a supply voltage monitor according to an embodiment of the present invention. This diagram is merely an example, which should not unduly limit the scope of the claims. One of ordinary skill in the art would recognize many variations, alternatives, and modifications. According to a specific embodiment, the supply voltage monitor is used to implement the comparator 930 in FIG. 9. For example, the comparator 930 is implemented in conjunction with a conventional under-voltage lockout (UVLO) circuit. For example, FIG. 10 illustrates a detailed circuit diagram of a supply voltage monitor 1002 and a UVLO circuit 1001. According to an embodiment, the UVLO circuit 1001 is configured to send out a power-on-reset (POR) signal (e.g., output of the inverter 1010) when the supply voltage VDD is turned on. When the supply voltage VDD reaches a predetermined level (e.g., UVLO (OFF)), the ULVO circuit outputs a POR signal so that the power system starts operating. When the supply voltage VDD drops below a threshold level, the operations of the power system is halted.

As seen in FIG. 10, a positive feedback loop is formed by the zener diodes 1017 and 1013, MOSFETs 1016, 1015, 1018, and 1023, a diode 1012, resistors 1011, 1019, and 1080. For example, after power on if the VDD voltage 1030 increases to a predetermined level, the gate voltage of the MOSFET 1023 is turned on and the positive feedback loop is activated. The output of the MOSFET 1023 pulls down the gate voltage of the MOSFET 1018, which causes the zener diode 1017 to be shorted. As a result, a POR signal is provided. As an example, when the VDD voltage 1030 drops to and/or below the ULVO threshold voltage, the MOSFET 1023 is turned off, and the positive feedback is activated, which causes the gate of the MOSFET 1018 to be pulled up to VDD voltage through resistor 1019, causing the power system to halt.

According to a specific embodiment, a resistor ladder is formed by resistors 1080 and 1011. By adjusting the relative ratio of these two resistors and matching the transistor 1060 and 1023, the VDD_Cout signal 1050 can be generated when the VDD voltage 1030 falls to the sum of UVLO threshold voltage and the Vth2 voltage. For example, a voltage gap, with the magnitude of the Vth2 voltage, is produced.

It is to be understood FIG. 10 illustrates a specific component of the power system according to an embodiment of the present invention. There can be many alternations and variations. For example, various types of diodes, resistors, and gates can be used to implement the UVLO and comparator circuits. There can be other structures as well.

According to an embodiment, the present invention provides a system for regulating a power converter. The system comprises a signal processing component that is configured to receive a first voltage and a second voltage, to process information associated with the first voltage and the second voltage, to determine a signal based on at least information associated with the first voltage and the second voltage, and to send the signal to a switch for a power converter. The switch is regulated based on at least information associated with the signal. The signal processing component is further configured to determine the signal to be associated a first mode, if the first voltage is higher than a first threshold. If the first voltage is lower than a second threshold and the second voltage is higher than a third threshold, the signal processing component determines the signal to be associated with a second mode. If the first voltage is lower than the second threshold and the second voltage is lower than the third threshold, the signal processing component determines the signal to be associated with a third mode. If the signal is associated with the first mode, the signal processing component causes the switch to be modulated at a first frequency. If the signal is associated with the second mode, the signal processing component causes the switch not to be modulated. If the signal is associated with the third mode, the signal processing component causes the switch to be closed for a period of time. For example, the embodiment can be illustrated according to FIG. 4.

According to another embodiment, the present invention provides a method for regulating a power converter. The method includes a step for receiving a first voltage. The method also includes a step for receiving a second voltage. The method additionally includes a step for processing information associated with the first voltage and the second voltage. Additionally, the method includes a step for determining a signal based on at least information associated with the first voltage and the second voltage. Further, the method includes a step for regulating a switch for a power converter based on at least information associated with the signal. The determining a signal is based on at least information associated with the first voltage and the second voltage. If the first voltage is higher than a first threshold, the signal is associated with a first mode. If the first voltage is lower than a second threshold and the second voltage is higher than a third threshold, signal to is associated with a second mode. If the first voltage is lower than the second threshold and the second voltage is lower than the third threshold, the signal to is associated with a third mode. The step of regulating a switch for a power converter includes causing the switch to be modulated at a first frequency if the signal is associated with the first mode. If the signal is associated with the second mode, the switch is not modulated. If the signal is associated with the third mode, causing the switch is closed for a period of time. For example, the embodiment invention can be illustrated according to FIGS. 5-6.

According to yet another embodiment, the present invention provides a system for regulating a power converter. The system includes a signal processing component that is configured to receive a first voltage and a second voltage, to process information associated with the first voltage and the second voltage, to determine a signal based on at least information associated with the first voltage and the second voltage, and to send the signal to a switch for a power converter. The switch is regulated based on at least information associated with the signal. The signal processing component is configured to determine the signal to be associated with a first mode, if the first voltage is higher than a first threshold. If the first voltage is lower than a second threshold and the second voltage is higher than a third threshold, the signal is associated with a second mode. If the first voltage is lower than the second threshold and the second voltage is lower than the third threshold, the signal is associated with a third mode. If the signal is associated with the first mode, the signal processing component causes the switch to be modulated at a first frequency. If the signal is associated with the second mode, the signal processing component causes the switch not to be modulated. If the signal is associated with the third mode, the signal processing component causes the switch to be modulated at a second frequency. For example, the embodiment can be illustrated according to FIG. 4.

According to yet another embodiment, the present invention provides a method for regulating a power converter. The method includes a step for receiving a first voltage. The method also includes a step for receiving a second voltage. The method additionally includes a step for processing information associated with the first voltage and the second voltage. Also, the method includes a step for determining a signal based on at least information associated with the first voltage and the second voltage. The method further includes a step for regulating a switch for a power converter based on at least information associated with the signal. The step of determining a signal based on at least information associated with the first voltage and the second voltage includes determining various voltages. If the first voltage is higher than a first threshold, the signal is associated with a first mode. If the first voltage is lower than a second threshold and the second voltage is higher than a third threshold, the signal is associated with a second mode. If the first voltage is lower than the second threshold and the second voltage is lower than the third threshold, the signal is associated with a third mode. If the signal is associated with the first mode, the switch is modulated at a first frequency. If the signal is associated with the second mode, the switch is not modulated. If the signal is associated with the third mode, the switch is modulated at a second frequency. For example, the embodiment can be illustrated according FIG. 6.

According to yet another embodiment, the present invention provides a system for regulating a power converter. The system includes a signal processing component configured to receive a voltage, to process information associated with the voltage, and to determine a signal based on at least information associated with the voltage, and to send the signal to a switch for a power converter. The switch is regulated based on at least information associated with the signal. If the voltage is higher than a first threshold, the signal is associated a first mode. If the voltage is lower than a second threshold, the signal is associated with a second mode. The signal processing component is configured to process information associated with the voltage, a third threshold, and a fourth threshold, the third threshold and the fourth threshold being different. The signal processing component is further configured to determine a modulation frequency based on at least information associated with the first voltage, the third threshold, and the fourth threshold. If the signal is associated with the first mode, the signal processing component causes the switch to be modulated at the modulation frequency. If the signal is associated with the second mode, the signal processing component causes the switch not to be modulated. For example, the embodiment can be illustrated according to FIG. 4.

According to yet another embodiment, the present invention provides a method for regulating a power converter. The method includes a step for receiving a voltage. The method also includes step for processing information associated with the voltage. The method additionally includes a step for determining a signal based on at least information associated with the voltage. The method further includes a step for regulating a switch for a power converter based on at least information associated with the signal. If the voltage is higher than a first threshold, the signal is associated a first mode. If the voltage is lower than a second threshold, the signal is associated with a second mode. The signal is determined based on at least information associated with the voltage further. The process of determining the signal includes processing information associated with the voltage, a third threshold, and a fourth threshold, the third threshold and the fourth threshold being different. The process of determining the signal further includes a step for determining a modulation frequency based on at least information associated with the first voltage, the third threshold, and the fourth threshold. If the signal is associated with the first mode, the switch is modulated at the modulation frequency. If the signal is associated with the second mode, the switch is not modulated. For example, the embodiment can be illustrated according to FIG. 6.

It is to be appreciated that the present invention provides various advantages over conventional techniques. According to an embodiment, the present invention provides a more energy efficient solution as compared to conventional techniques. For example, the present invention reduces the numbers of transitions between on and off states of a power supply. According to another embodiment, the present invention offers a large window for power control and great flexibility. For example, more than one threshold voltage threshold values are used in determining various states of the power supply. There are other benefits as well.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for regulating a power converter, the system comprising:
  a signal processing component configured to receive a first voltage and a second voltage, to process information associated with the first voltage and the second voltage, to determine a first signal based on at least information associated with the first voltage and the second voltage, and to send the first signal to a switch for a power converter, the switch being regulated based on at least information associated with the first signal;
  wherein the signal processing component is further configured to:
  if the first voltage is higher than a first threshold, determine the first signal to be associated with a first mode;
  if the first voltage is lower than a second threshold and the second voltage is higher than a third threshold, determine the first signal to be associated with a second mode; and
  if the first voltage is lower than the second threshold and the second voltage is lower than the third threshold, determine the first signal to be associated with a third mode;
  wherein:
    the third threshold is higher than an under-voltage-lockout voltage;
    if the first signal is associated with the first mode, the signal processing component causes the switch to be modulated at a first frequency;
    if the first signal is associated with the second mode, the signal processing component causes the switch not to be modulated; and
    if the first signal is associated with the third mode, the signal processing component causes the switch to be modulated at a second frequency.

2. The system of claim 1 wherein the first threshold and the second threshold are the same.

3. The system of claim 1 wherein the first threshold and the second threshold are different.

4. The system of claim 1 wherein the first threshold is lower than the second threshold.

5. The system of claim 1 wherein the first frequency and the second frequency are the same.

6. The system of claim 1 wherein the first frequency and the second frequency are different.

7. The system of claim 1 wherein the first frequency is higher than the second frequency.

8. The system of claim 1 wherein the first frequency is associated with a first energy consumption level and the second frequency is associated with a second energy consumption level, the first energy consumption level being higher than the second energy consumption level.

9. The system of claim 1 wherein the signal processing component comprises:
  a first controller module being configured to process information associated with the first voltage and the second voltage and to determine a second signal based on at least information associated with the first voltage and the second voltage;
  a second controller module being configured to provide modulation for the switch; and
  a third controller module being configured to provide a pulse, the pulse causing the switch to be turned on for a period of time.

10. A method for regulating a power converter, the method comprising:
  receiving a first voltage; receiving a second voltage; processing information associated with the first voltage and the second voltage;
  determining a signal based on at least information associated with the first voltage and the second voltage; and
  regulating a switch for a power converter based on at least information associated with the signal;
  wherein the determining a signal based on at least information associated with the first voltage and the second voltage comprises:
    if the first voltage is higher than a first threshold, determining the signal to be associated with a first mode;
    if the first voltage is lower than a second threshold and the second voltage is higher than a third threshold, determining the signal to be associated with a second mode;

if the first voltage is lower than the second threshold and the second voltage is lower than the third threshold, determining the signal to be associated with a third mode;

wherein the regulating a switch for a power converter includes:
if the signal is associated with the first mode, causing the switch to be modulated at a first frequency;
if the signal is associated with the second mode, causing the switch not to be modulated; and
if the signal is associated with the third mode, causing the switch to be modulated at a second frequency;

wherein the third threshold is higher than an under-voltage-lockout voltage.

11. The method of claim 10 wherein the first voltage is associated with a feedback voltage.

12. The method of claim 10 wherein the second voltage is associated with a supply voltage.

13. The method of claim 10 wherein the first frequency is higher than the second frequency.

14. The method of claim 10 wherein the first frequency is associated with a first power consumption level and the second frequency is associated with a second power consumption level, the first power consumption level being higher than the second power consumption level.

* * * * *